Oct. 17, 1933.   P. S. VOSBIKIAN ET AL   1,931,045
GRASS SHEARS
Filed April 1, 1933
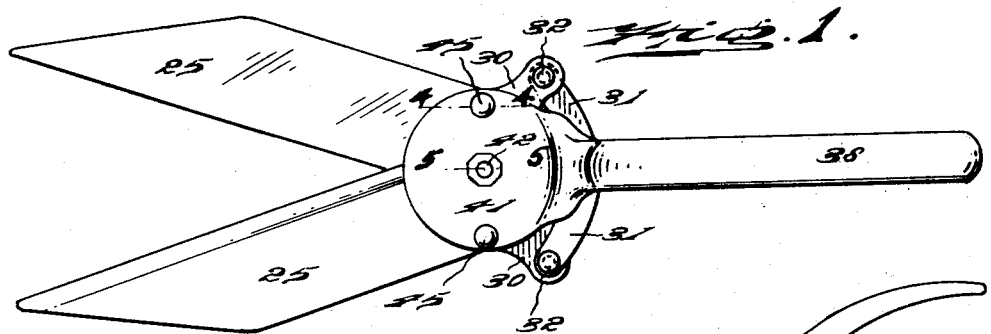
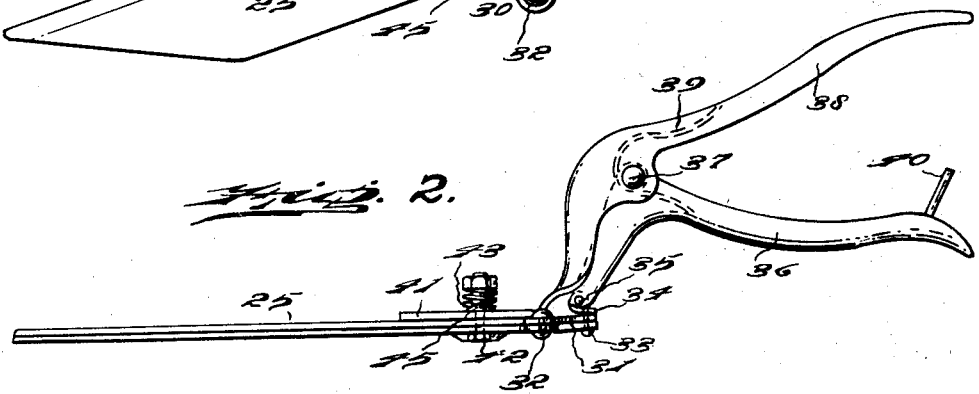
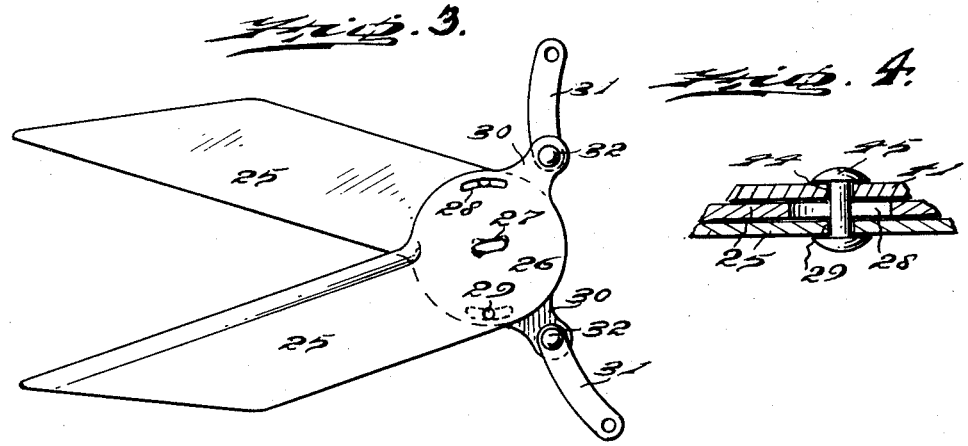
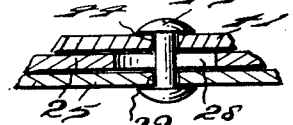
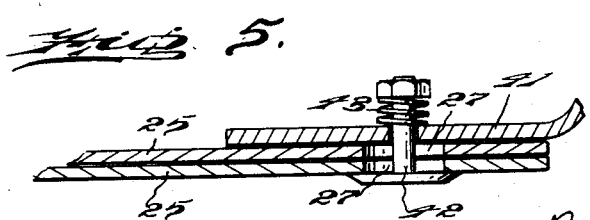
INVENTOR.
Peter S. Vosbikian
Thomas S. Vosbikian
BY
Herbert S. Fairbanks
ATTORNEY.

Patented Oct. 17, 1933

1,931,045

UNITED STATES PATENT OFFICE 1,931,045

GRASS SHEARS

Peter S. Vosbikian and Thomas S. Vosbikian, Philadelphia, Pa., said Peter S. Vosbikian assignor to said Thomas S. Vosbikian Application April 1, 1933. Serial No. 663,918

2 Claims. (Cl. 30—11)

The object of this invention is to devise a novel construction of grass shears which will give an increased leverage over the customary type of grass shears and in which the handles are offset so that the shears can be employed in locations where there is little clearance for the use of the shears.

A further object of our invention is to devise a novel construction and arrangement of grass shears wherein cutting blades can be stamped from sheet material so that each cutting blade will be of the same contour, said blades being pivotally connected with one of the handles and having a linkage with the other handle.

A further object of the invention is to devise a novel construction and arrangement of grass shears wherein a stationary and movable handle is provided and the cutting blades are independent of the handle and are provided with cam grooves to provide a relative longitudinal movement of the blades during their operation.

A further object of our invention is to devise a novel construction and arrangement of grass shears having a fixed and a movable handle, the movable handle being connected by a linkage with the cutting blades in such a manner that the rearward movement of such linkage causes a cam action on the blades.

With the above and other objects in view, as will hereinafter more clearly appear, our invention comprehends a novel construction and arrangement of grass shears wherein a fixed and a movable handle are provided and the cutting blades are each of the same construction, and pivotally connected with the fixed handle and connected by a novel construction and arrangement of linkage with the movable handle.

It further comprehends novel grass shears wherein separate cutting blades are provided which can be formed by a stamping, the rear ends of the blades forming cooperating bearing portions. The blades are pivotally connected with a fixed handle and a movable handle is resiliently connected with the fixed handle and connected with the blades by a novel linkage arrangement and a swivelled member.

It further comprehends novel grass shears wherein the cutting blades are each of the same formation and have an enlarged opening through which their pivotal connection passes each of the blades having a cam slot at one side of the pivotal point through which a fastening device passes which is carried by the cooperating blade, the blades being linked in a novel manner with a movable handle and a fixed handle being provided which carries the pivotal connection for the blades.

Other novel features of construction and advantage will hereinafter appear in the detailed description and the appended claims.

For the purpose of illustrating our invention, we have shown in the accompanying drawing a preferred embodiment of it, which, in practice, will give satisfactory and reliable results. It is, however, to be understood that this embodiment is typical only and the various instrumentalities of which our invention consists can be variously arranged and organized, and the invention is not limited to the exact arrangement and organization of these instrumentalities as herein set forth.

Figure 1 is a top plan view of our invention.

Figure 2 is a side elevation of the construction seen in Figure 1.

Figure 3 is a top plan view of the cutting blades and links connected therewith.

Figure 4 is a section on line 4—4 of Figure 1.

Figure 5 is a section on line 5—5 of Figure 1.

Similar numerals of reference indicate corresponding parts.

Referring to the drawing:

The bearing members are provided with pin and slot connections which cause a different action of the cutting blades during their operation so that a draw cut is effective as both of the blades are drawn rearwardly during their closing operation.

25 designates the cutting blades each of which are of the same formation and can be stamped from sheet material. Each cutting blade at its rear end is provided with a disc shaped bearing portion 26 having a cam slot 27 centrally thereof and having on one side of such cam slot a curved slot 28, and on the opposite side a hole 29. Each cutting blade is also provided with an outwardly deflected lug 30 to which are pivoted the links 31 by means of the rivets 32. The free ends of these links 31 are pivotally connected by means of a fastening device 33 with a bracket 34, and secured to the movable handle. As best seen in Figure 2, the bracket 34 has the trunnions 35 which are received in openings in the movable handle 36. This movable handle 36 is pivoted at 37 to the stationary handle 38 and a spring 39 is provided which tends to cause the opening movement of the handles 36 and 38. One of the handles, such as, for example, the movable handle 36, may be provided with a stop 40. The fixed handle 38 terminates at its forward end in a bearing disc 41 which is apertured to receive the fastening device 42 which also passes through the cam slots 27 in the bearing members 26 of the cutting blades. These slots 27 are preferably substantially straight at one side and curved at the opposite side. The fastening device 42 which forms a pivot member passes through the cutting blades and the bearing disc 41 and, as illustrated, is in the form of a screw and nut and a spring 43 is interposed between the nut and the bearing member 41. The bearing member 41 is provided with openings 44 which pass through an opening 29 in one cutting blade and through the cam slot 28 in the opposite cutting blade.

In this form of our invention each of the blades is provided with an offset outwardly extending arm at one side of its fulcrum to which the links are connected which operate the cutting blades. Instead of having a fixed pivot for the blades, the two cam slots 27 are provided and each blade pivotally connected with the fixed bearing member 41 so that each blade swings on a different fulcrum, such as, for example, the rivets 45. This enables one to obtain a greater leverage than if a fixed pivotal connection was provided at the central bearing portions of the cutting blades.

Having thus described our invention what we claim as new and desire to secure by Letters Patent, is:—

1. Grass shears, comprising cutting blades, each having a bearing portion at its rear end, a cam slot at its central portion, an aperture near one side edge, a curved slot near its opposite side edge, and an outwardly projecting arm, the blades being assembled with the aperture in one blade registering with the curved slot in the other blade, a stationary handle having a bearing portion, a handle movably connected with said stationary handle, fastening devices passing through said registering apertures and curved slots and handle bearing portion, a fastening device passing through said cam slots and handle bearing portion, and links pivotally connected with said arms and said movable handle.

2. Grass shears, comprising cutting blades, each of the same construction having a bearing portion with a central longitudinally extending cam slot, a curved slot at one side and an aperture at the opposite side, and assembled with the curved slot of one blade registering with the aperture of the other blade, a stationary handle having a bearing portion, fastening devices passing through the registering apertures and curved slots and bearing portion of the handle, a fastening device passing through said cam slots and handle bearing portion, a movable handle connected with said stationary handle, links connected with opposite sides of said blade bearing portions, and a bracket pivotally connected with said links and with said movable handle.

PETER S. VOSBIKIAN.
THOMAS S. VOSBIKIAN.